US006984713B2

(12) United States Patent
Bauer

(10) Patent No.: US 6,984,713 B2
(45) Date of Patent: Jan. 10, 2006

(54) SULFONATED POLYETHERKETONEKETONE

(75) Inventor: Bernd Bauer, Vaihingen/Enz (DE)

(73) Assignee: FuMa-Tech Gesellschaft fur funktionelle Membranen und Anlagentechnologie mbH, St. Ingbert (DE)

( * ) Notice: Subject to any disclaimer, the term of this patent is extended or adjusted under 35 U.S.C. 154(b) by 58 days.

(21) Appl. No.: 10/473,461

(22) PCT Filed: Mar. 27, 2002

(86) PCT No.: PCT/EP02/03402

§ 371 (c)(1),
(2), (4) Date: Feb. 17, 2004

(87) PCT Pub. No.: WO02/077068

PCT Pub. Date: Oct. 3, 2002

(65) Prior Publication Data

US 2004/0131910 A1    Jul. 8, 2004

(30) Foreign Application Priority Data

Mar. 28, 2001  (DE) ................ 101 16 391

(51) Int. Cl.
*C08G 10/00*    (2006.01)
(52) U.S. Cl. .............. 528/220; 528/125; 528/175; 528/226; 525/391; 525/471
(58) Field of Classification Search ......... 528/220, 528/125, 175, 226; 525/341, 471
See application file for complete search history.

(56) References Cited

U.S. PATENT DOCUMENTS 5,438,082 A    8/1995    Helmer-Metzmann et al.

FOREIGN PATENT DOCUMENTS

| EP | 0 382 356 | 8/1990 |
|---|---|---|
| EP | 0 574 791 | 12/1993 |
| EP | 0 824 959 | 2/1998 |
| GB | 2 285 261 | 7/1995 |

OTHER PUBLICATIONS

Wang, Feng, et al., "Sodium sulfonate-functionalized poly (ether ether ketone)s". Macromol. Chem. Phys., vol. 199, pp. 1421-1426, 1998.
Jla, Lianda, et al., "Sulfonation of Polyetheretherketone and Its Effects on Permeation Behavior to Nitrogen and Water Vapor". Journal of Applied Polymer Science, vol. 60, pp. 1231-1237, 1996.
Colquhoun, H. M., et al., "Polyetherketones based on para-carborane: synthesis, sulfonation, and membrane-forming characteristic". Polymer, vol. 38, No. 17, pp. 4539-4546, 1997.
Liu S., et al., "Novel sodium sulfonate-functionalized poly (ether ether ketone)s derived from 4,4'-thiodiphenol". Polymer, vol. 42, No. 7, pp. 3293-3296, 2001.
Yi, Huiyang, et al., "Synthesis of sulfonated PEKK by ortho-experiment method". HCAPLUS Abstract No.: 1998: 365501 (abstract only).

*Primary Examiner*—Duc Troung
(74) *Attorney, Agent, or Firm*—Nath & Associates PLLC; Gary M. Nath; Tanya E. Harkins

(57) ABSTRACT

The invention relates to a sulfonated polyetherketonketone (sPEKK), which is amorphous and/or which can be obtained by sulfonating amorphous PEKK. This sPEKK can be preferably produced by using a diphenyl ether and a benzenedicarboxylic acid derivate. Particularly preferred is the use of benzenedicarboxylic acid dichloride. The benzenedicarboxylic acid derivative is advantageously provided in the form of a mixture consisting of at least two different benzenedicarboxylic acid derivatives, in particular, an isophthalic acid derivative and a terephthalic acid derivative.

31 Claims, No Drawings

SULFONATED POLYETHERKETONEKETONE

The present invention concerns sulfonated polyether ketone ketone (sPEKK), procedures for its production and membranes and polymer mixtures made from sPEKK.

Membranes are used today in many areas of engineering. Membranes must have very special characteristics for their extremely varied applications. Membranes used in electrodialysis, electrolysis, Donnan dialysis as well as in batteries are so-called perm-selective membranes and can enable the permeation of ions. They are also called cation exchanger membranes. Proton conductors are membranes used in fuel cells. Just like in other galvanic elements, electric energy in a fuel cell is produced by direct energy conversion of chemical energy. The reaction areas around the anode and the cathode are separated by a membrane in this case, which is permeable for protons.

Technical membranes employed in such applications have to fulfill very high requirements. On one hand, they must ensure appropriate conduciveness, of course. On the other hand, they require high chemical and thermal stability. This characteristic is particularly important for membranes that are used in fuel cells.

There is already large variety of different membranes, which are suitable for certain applications. Examples are membranes on the basis of perfluorine sulfone acid, non-fluorinated polysulfone acids as well as polycarboxylate and polyphosphonate. An important representative of non-fluorinated membranes are the cation exchanger membranes used in electrodialysis, which are essentially made on the basis of cross-linked and sulfonated polystyrene. These membranes are made, for example, by mixing the monomers with PVC powder according to the paste method, during which the monomers are polymerized to create a film after which a cation exchanger membrane is created by sulfonation. Other special types of membranes are manufactured on the basis of acrylic acid monomers, for example. All these membranes are characterized by a reduced chemical and thermal stability, which is why they are in no way suitable for applications in fuel cells due to the lack of oxidation resistance.

For applications in fuel cells, membranes made of sulfonated polyether ether ketone have gained a limited importance. However, such membranes can be used only at low application temperatures and low power densities and short usage since their chemical stability under oxidative conditions is very limited. In this case, two degradative reactions of the non-fluoridated polymers play an important role: oxidations and desulfonation under oxidative conditions or at elevated temperatures. This can probably be explained by the reduced CH binding enthalpy compared to per-fluoridated systems. Tertiary bencyclic CH groups, in particular, are not resistant to an attack by a hydro-peroxide radical.

Among the non-fluoridated polymers, only purely aromatic molecule chains have sufficient oxidation stability. Among these, the aryl polymers with only oxygen and sulfur as heteroatom should be mentioned as important polymers. The necessary conductivity must be ensured by an appropriate sulfonation degree in this case. However, the water solubility rises with rising sulfonation degree, so that many materials that are possible in principle are not suitable for membrane production when a sufficiently high conductivity is achieved by corresponding sulfonation.

In particular, polyketones can be used in such applications. For these reasons, the area of sulfonation of polyaryl ether ketones has been an area of intensive research for a long time. It can be seen that the oxidation resistance of the material is clearly improved with an increasing part of keto groups in the polyether ketone. With an increasing part of Keto groups, the crystallinity, the melting temperature and the melting viscosity of the material rises as well.

This makes sulfonation much more difficult, which is why the polyether ketone needs very strong sulfonation agents, such as sulfur trioxide ($SO_3$) or $SO_3$ complexly bound to tri ethanol phosphoric acid esters. Important disadvantages of such strong sulfonation agents are chain breaking during the sulfonation reaction and occurring cross-linking, both of which impair the quality of the sulfonated material. Very important also is the extremely high chemical consumption during the sulfonation, which is accompanied by corresponding high costs.

First experiments with sulfonation on O-phenylene-CO structures of polyether ketones in nucleophilic substitution reactions were performed in 1985. Since in O-phenylene-CO structures, the phenylene rings are strongly deactivated with respect to the ketone unit, direct sulfonation of ketone-rich polyaryl ether ketones is accordingly difficult. When using free sulfur trioxide, however, certain sulfonation yields can be achieved. DE 196 10 303, for example, describes a sulfonation process with smoking sulfuric acid. Into the 2-step process described here, the polyether ketone is first dissolved in sulfuric acid and the sulfonation is initiated by adding oleum to the reaction mixture.

For the sulfonation in sulfuric acid, approximately 10 l of sulfuric acid and/or oleum is used for the production of approximately 1 kg membrane raw material. As a waste product, approx. 200 l of diluted sulfuric acid is produced and must be neutralized. These large quantities of solvent, constitute a significant problem for the environment and for waste disposal.

Substitution reactions with chlorosulfonic acid done on polyether ketones have been described by Lifter and Marvel (M. I. Litter, C. S. Marvel, J. Polym. Sci., Polym. Chem. Ed, 23 (1985) 2205–2223). However reaction temperatures of up to 90° C. are required in this case so that at least a partial decomposition of the polymer main chain must be expected. This creates solubility problems of the products, which make a further processing into membranes more difficult or impossible.

So far polyether ether ketone (PEEK) is preferably used as the typical basic polymer for the production of relatively stable cation exchanger membranes. Long-term investigations show, however, that a chemical, thermal and, in particular also, mechanical stability that is sufficient for the use in fuel cells is given only at low temperatures up to a maximum operating temperature of 70° C. At higher temperatures, strong swelling occurs, which is later superposed by additional desulfonation. Although due to its electrochemical characteristics, sulfonated polyether ether ketone is in principle suitable for the employment in fuel cells, it has only limited use due to its chemical and mechanical stability.

The invention therefor has the task to make available a material that is suitable for the production of membranes. The membranes should have sufficient chemical and thermal stability so that the membranes are suitable for application in fuel cells and the like. In particular, the membranes should be stable under oxidative conditions and/or at elevated temperatures. In addition, the invention has the task to avoid strong sulfonation agents during the sulfonation of the material. This should reduce the disposal problem and lower the production costs of the membranes considerably.

This task is solved by sulfonated polyether ketone ketone (sPEKK), as it is described in claim 1. Preferred embodiments are stated in the claims 2 to 12. The claims 13 to 19 concern membranes that can be manufactured with this material. Claim 20 describes a corresponding polymer blend. Claim 21 concerns fuel cells and claim 22, as well as its dependent claims 23 to 29, concerns a procedure for the production of sulfonated polyether ketone ketone. Claim 30 describes the sulfonated polyether ketone ketone that can be manufactured according to this procedure. The claims 31 to 33 concern the use of the sulfonated polyether ketone ketone. The wording of all claims is hereby made with reference to the content of the description.

The sulfonated, to a large extent amorphous polyether ketone ketone (sPEKK) according to the invention is particularly suitable for the applications in membranes described above. The membranes are chemically, thermally and mechanically stable. Furthermore, the sulfonation can be accomplished far more easily. The sPEKK according to the invention is characterized by the fact that it is amorphous and/or is available by sulfonation of amorphous PEKK. Traditionally, mainly crystalline polymer was used for sulfonation. This is accessible to a sulfonation process only with extreme difficulties, which is why very strong sulfonation reagents had to be used. By using amorphous raw material, it is now possible to achieve sulfonation under considerably milder conditions. The material is much better accessible to the reagents due to its more irregular structure, which is why the use of large quantities of strong chemicals can be avoided and the production can be accomplished much more economically and with fewer environmental problems.

In a preferred embodiment, the polyether ketone ketone is manufactured using diphenyl ether and a benzene dicarbonic acid derivative. Preferably, the group in the polymer that stems from the benzene dicarbonic acid is present in at least two different modifications, more particularly in the form of isomers, reducing the degree of crystallinity. This material exhibits partially amorphous and partially crystalline structures, which make it very accessible to a sulfonation process.

In order to facilitate the polymerization reactions, an acid chloride of the benzene dicarbonic acid is preferably used. Particularly preferred in this case is benzene dicarbonic acid dichloride. However, different derivatives are also covered by the invention. Another possible option, for example, is the acid anhydride as an activated form of the benzene dicarbonic acid.

According to the invention, the bonds of the polymer chain are preferably partly in para and partly in meta position. This creates the partially amorphous structure, which is important for the sulfonation according to the invention. In a preferred embodiment of the invention in this case, part of the phenylene groups, more particularly the phenylene group between two keto groups, is present in a bond other than the para position. This is in particular the meta position, but an ortho position could also be possible, for example.

It is advantageous if the benzene dicarbonic acid derivative as a raw material for the copolymerization is a mixture of at least two different benzene dicarbonic acid derivatives. More particularly, these benzene dicarbonic acid derivatives are an isophtalic acid derivative and a terephthalic acid derivative. A copolymer manufactured in this way is a particularly suitable amorphous material for the sulfonation.

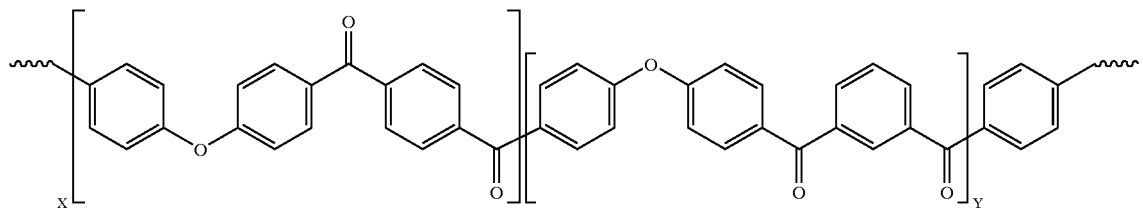

The portion of crystalline and amorphous areas in the copolymer depends on the ratio of the terephthalic acid derivative and the isophtalic acid derivative. The conversion of diphenyl ether with only terephthalic acid would lead to a highly crystalline linear polyether ketone ketone. Such a polymer is essentially insoluble and unsuitable for sulfonation. The conversion of diphenyl ether and isophtalic acid would create a completely amorphous, and usually also essentially low-molecular, polyether ketone ketone. Such a polymer has only low film creation characteristics and is therefore relatively unsuitable for the membrane production. With the mixing ration of terephthalic acid and isophtalic acid, the crystallinity and/or the amorphism of the copolymer can be adjusted and thus parameters such as solubility and melting viscosity can be adapted. A ratio of 60% terephthalic acid and 40% isophtalic acid, for example, leads to a glass temperature of 154° C., a melting point of 310° C., and a density of 1.26. A ratio of 20% terephthalic acid and 80% isophtalic acid leads to a glass temperature of 168° C.

In a preferred embodiment, about 10 to approximately 60% by weight of isophtalic acid derivative and about 40 to approximately 90% by weight of terephthalic acid derivative is used. Particularly preferred is a mixture of approximately 30 to approximately 50% isophtalic acid derivative and about 50 to approximately 70% terephthalic acid derivative.

This mixture is converted with diphenyl ether. Preferably, about 1 to approximately 3 parts diphenyl ether and about 1 to approximately 3 parts benzene dicarbonic acid derivative are used. Particularly preferred is a reaction of one part diphenyl ether and one part benzene dicarbonic acid derivative. The use of precisely equimolar quantities is particularly favorable because it makes it possible to achieve particularly high molecular weights.

In this way, it is possible to obtain largely amorphous, high-molecular polymers, which surprisingly, and fortunately, are much better soluble in sulfuric acid and/or in sulfuric acid/oleum and other solvents than all polyether ketones examined so far. Even course powder and/or unground granulate, as it is usually used in technical applications, are dissolved almost completely after only a few hours of stirring at ambient temperature, for example, while no measurable sulphonation takes place at first. In the desired reaction times from 48 to 120 hours on average, the sulphonation process takes place almost exclusively in the homogeneous phase. The portion of processing in sulphuric acid is approximately 100% in this case.

In a preferred embodiment of the invention, the sulphonation of the copolymer takes place using at least one solvent and/or at least one sulphonation agent. As solvents, sulfuric acid can be used, for example. A special advantage of the present invention is, however, that different solvents, more particularly halogenated solvents, can also be used. Non-sulfonating solvents are used in combination with at least one sulphonation agent. A particularly suitable solvent for the sulphonation is dichloromethane.

In the invention, oleum can be used as sulphonation agent. This refers to "smoking sulphuric acid", i.e. concentrated sulfuric acid, which still contains varying quantities of sulfur troxide. A special advantage of the invention is, however, that due to the partially amorphous structure of the copolymers, weaker sulphonation agents are also effective. Of course, different suitable sulphonation agents can also be used.

Advantageously, the sulfonation degree of the amorphous polyether ketones according to the invention is adjustable, contrary to the case of conventional sulfonated polyether ketones. It is therefore possible according to invention to determine for example the conductivity of the diaphragm to be manufactured by adjusting sulfonation degree. The sulfonation, which usually takes place in ortho position with respect to the ether group, also affects the water solubility of the product. This may have to be considered when selecting the sulfonation degree for the respective application purpose of the product. The regulation of the sulfonation degree is preferably done by setting a corresponding sulfur trioxide concentration in the reaction. This can be achieved, for example, by adding oleum of different concentrations to the original mixture.

The simplest monomer unit of the polyether ketone ketone has an equivalence weight of 300 Da. In the case of a simple sulfonation, i.e. in the case of simple substitution for each monomer unit, the resulting equivalence weight of the free sulfone acid is 380 Da, while the ion exchanger capacity is 2.63 mmol/g dry polymer. Since the isophtalic acid group and the terephthalic acid group in the copolymer sulfonate at different rates, a different first plateau of the sulfonation is achieved depending on the mixing proportion of the benzene dicarbonic acid derivatives in the copolymer. For example, for a copolymer with a ratio of 60:40= T:I a first plateau of the sulfonation is achieved at an equivalence weight of 620 Da or at an ion exchanger capacity of 1.61 meq/g. It is, however, easy according to the invention to obtain higher sulfonation degrees.

Most advantageously, the sulfonation degree is approximately 0.1 to approximately 3.0 mmol sulfonic acid/g polymer. The preferred sulfonation degree is approximately 0.2 to approximately 2.5 mmol Sulfonic acid/g polymer. For the production of membranes for fuel cells, a particularly suitable sulfonation degree is approximately 1.0 to approximately 2.2 mmol sulfonic acid/g polymer. In another preferred embodiment of the invention, a sulfonation degree of approximately 0.2 or less mmol sulfonic acid/g polymer is provided. With conventional sulfonated polyether ketones, a controlled adjustment of such low sulfonation degrees is not feasible. The low sulfonation degrees that can be set now thanks to the invention can now be used, for example, for ion exchanger membranes.

Advantageously, the sulfonated PEKK is available as an alcohol and/or water-soluble product. This material can be used very advantageously, for example, for the production of membrane electrode units. The sulfonation degree preferred for this application is approximately 2.0 to approximately 2.5 mmol sulfonic acid/g polymer, more particularly approximately 2.3 to approximately 2.4 mmol sulfonic acid/g polymer.

In a particularly preferred embodiment, the sulfonated polyether ketone ketone according to the invention is available in form of a membrane. Such a membrane can advantageously be a cation exchanger membrane and/or a proton conductor membrane. However, different membrane types that can be manufactured from the material according to the invention are also covered by the invention. The membranes are intended, for example, for an electrodialysis, electrolysis, Donnan dialysis and for the application in batteries. Particularly preferred are membranes that can be employed in fuel cells. With conventional membranes, the use of membranes in fuel cells is possible only to a very limited extent because there are extreme requirements for the chemical and thermal stability of the membranes. The membranes according to the invention are particularly suited for this application, and in particular for polymer electrolyte membrane fuel cells (PEMFC) and direct methanol fuel cells (DMFC), thanks to their extraordinary properties.

The membranes according to the invention can be manufactured with conventional methods. For example, the sulfonated polymer can be spread into film from a solution and the solvent can be evaporated. Likewise, a membrane can be also manufactured, for example, by extrusion according to well-known methods. With these different procedures, membranes and/or films of different thicknesses can be achieved. This thickness can range from a few $\mu$m up to several hundred $\mu$m. The time of the sulfonation can be selected differently. For example, the membrane can be produced first from PEKK, for example by an extrusion of the polyether ketone ketone to create the foil, and the sulfonation can take place in the following step, for example by conversion with thionyl chloride in a halogenated solvent. On the other hand, it is also possible to first perform the sulfonation of the polyether ketone ketone and manufacture the membrane in the following work step.

For some application purposes it can make sense to post-treat the membrane according to the invention. This applies particularly to membranes that are intended for the use in fuel cells.

An important characteristic of the membranes according to the invention for the employment in electrical membrane procedures and/or fuel cells is their specific surface resistance. It can be determined by the processing, by possible tissue reinforcement, and/or by the membrane thickness. A substantial factor here is however the specific conductivity of the base material. In order to test whether the various advantages of the sulfonated polymer ketone ketone according to the invention with regards to chemical and thermal stability and lower costs go along with an increased resistance of the membrane, comparison films of almost identical ion exchanger capacity were manufactured. Surprisingly, and fortunately, it could be shown during the comparison of these membranes that, for the substantially more stable amorphous polyether ketone ketone according to the invention, the same specific conductivity could be measured compared with the conventional polyaryl ether ketones, while maintaining the same fixed charge density.

In a particularly preferred embodiment of the invention, the membranes are blend membranes. In this case, the sulfonated polyether ketone ketone is thus mixed with another material to achieve certain characteristics for the finished membrane. For the additional material, there are a number of possible options. Particularly preferred is, for example, polyphenylene ether sulfone. A blend of sPEKK with polyphenylene ether sulfone can be used as a caustic blocker membrane. Such a blend membrane has the further advantage that swelling can be reduced and/or that the mechanical strength of the resulting membrane can be improved. In another preferred embodiment of the invention, the membrane is a blend of sPEKK with polysulfone. In addition, blends of sPEKK with different mixed oxides are covered by the invention. Examples are blends of sPEKK with dispersed silicic acid (silica) or with in-situ manufactured silicates made of tetra ethyl ortho silicate (TEOS) or amino phenyl trimetoxy silane/tetra ethyl ortho silicate (APTMOS TEOS). In another preferred embodiment of the invention, the membrane is a blend of sPEKK with heteropolyacids.

In another preferred embodiment of the invention, the membrane is a blend of sPEKK with zirconium sulfophenyl phosphonate, more particularly with amorphous zirconium sulfophenyl phosphonate. Furthermore, the invention includes blends of sPEKK with zirconium phosphates, more particularly with delaminated zirconium phosphates.

In a particularly preferred embodiment of the invention, the membrane is designed as a multilayer membrane. Preferably, the different layers of the membrane have different ion exchanger capacities. This can be used, for example, to restrain caustic solution, i.e. as base blockers, for example for the electrodialysis. Furthermore, the methanol drag in direct methanol fuel cells can be reduced in this manner. In addition, such membranes can be used to optimize the water balance in fuel cells, e.g. PEMFC.

In another preferred embodiment, a multilayer membrane is made from sPEKK and other ionomers. For example, modifications of sPEKK with perfluorosulfonic acid polymers are made to improve the oxidation stability. During an electrolysis, for example, anodic oxidation can be prevented in this manner and protection against a chlorine attack be ensured. In membranes with fuel cells, the cathode can be protected in this manner against an attack by hydroxyl radicals. In membranes for an electrodialysis, oxidative media, more particularly chromate, can hereby be concentrated.

In another preferred embodiment of the invention, the membrane on the basis of sPEKK is a multimatrix membrane. In this case, the pores of a nuclear track membrane on basis of PET foils (polyethylene terephthalate) can be filled with sPEKK, for example. Furthermore, the pores of a PVDF (polyvinyl difluoride) microfiltration membrane can be filled with sPEKK in a corresponding manner. In this way, it is possible to manufacture membranes that combine different characteristics.

In a particularly preferred embodiment of the invention, the membranes are mechanically reinforced membranes. The reinforcement can be a monofilament on the basis of polyether ether ketone (PEEK), for example, and/or on the basis of polyester and/or polyamide. Furthermore, it could be a multifilament. Particularly preferred, in this case, is a reinforcement on the basis of glass fiber tissue and/or on the basis of polyamide multifilament. In another preferred embodiment, the membrane according to the invention is reinforced with a fleece material, more particularly a fleece material that is not woven. This can be realized, for example, by reinforcement with a polypropylene fleece.

In another preferred embodiment of the invention, the membrane on the basis of sPEKK is coated with a catalyst. The catalyst in this case can be first dispersed, for example, in an sPEKK ionomer or in a solution of perfluorsulfonic acid in isopropanol.

In another preferred embodiment of the invention, the membrane according to the invention is a cross-linked material on basis of amorphous sPEKK. This can be achieved by a number of different manufacturing processes. Some examples are heating it up together with para-phenylendiamin, heating it up with dibenzoyl peroxide in an inert gas, heating the membrane in a sulfur trioxide atmosphere, heating it in a $SO_2Cl_2$ atmosphere, or post-treating it in a thermal process with dicyclohexylcarbodiimide (DCC) in a vacuum.

Advantageously, the membrane according to the invention can be a macroporous membrane. It can be manufactured for example by dry-wet phase inversion.

In another preferred embodiment of the invention, the sulfonated polyether ketone ketone is available as a mixture of at least one additional material. The additional material could be a wide variety of completely different substances, for example other ionomers. Regarding this, reference is made to what was said above.

Furthermore, the invention covers a fuel cell that includes the sPEKK according to the invention in form of a membrane. Concerning the characteristics of this membrane, reference is made to the description above. The fuel cells are preferably DMFC's or PEMFC's. In a particularly preferred embodiment of the fuel cell, the fuel cell, more particularly a DMFC, includes a multilayer membrane.

Furthermore, this invention includes a procedure for the production of sulfonated polyether ketone ketone. This procedure is characterized by the fact that amorphous polyether ketone ketone is sulfonated. Concerning the details of this procedure, reference is made to what was said above.

In addition, the invention covers sulfonated polyether ketone ketone, which is characterized by the fact that it is producible by a procedure, as is already described here. Furthermore, the invention covers the use of sulfonated amorphous PEKK for the production of membranes, more particularly of cation exchanger membranes and/or proton conductor membranes. Additionally, the invention covers the use of sulfonated amorphous PEKK for the production of a polymer mixture.

Further details of the invention result from the description of the following examples in connection with the dependent claims. In this case, the characteristics can be realized individually or in combination.

EXAMPLES

Example 1

Sulfonation with Oleum

In a temperature-controlled 250 ml stirring vessel, 10 g amorphous PEKK (powder; dried over $P_2O_5$ at 60° C. in a vacuum) is added to 60 ml sulfuric acid (96.38% by weight $H_2SO_4$) while stirring vigorously. The polymer dissolves without residual fraction within approximately one hour while turning yellow. The solution is stirred for another 12 hours at ambient temperature for equilibration, after which 40 ml of 25% oleum (resulting $SO_3$ concentration: 0.73% by weight) is added. The first sulfonation is observed with the addition of free $SO_3$. Until the reaction is stopped by stirring in 10 to 20 times the amount of deionized water, only moderate stirring is necessary. The threadlike product is sucked off after 24 hours of storage under water and then washed with water. This procedure is repeated three times. The material is dried first in a circulating air drying furnace at 60° C. and finally, exactly like the raw material, over $P_2O_5$.

To evaluate the solubility and determine the substitution degree, 50 to 100 mg of the sulfonated material is weighed and mixed with 20 ml n-methyl pyrrolidone. Dissolved or swollen samples are finally diluted with 60 ml water and titrated with 0.1 n NaOH.

The sulfonation with 0.73% by weight of free $SO_3$ at 45° C. thus leads to a substitution degree (IEC) of 1.04 mmol/g after 48 hours.

Samples with substitution degrees of IEC>=0.75 mmol/g are relatively well soluble in n-methyl pyrrolidone or dimethyl acetamide. For materials with IEC values under 1.6 mmol/g, the degree of the swelling in water still remains within acceptable limits. Dry material with sulfonic acid content from 1.0 to 2.0 mmol/g is clearly colored yellow.

TABLE I

Sulfonation of amorphous PEKK with 0.73% by weight of free $SO_3$, in 96% by weight of sulfuric acid

| Reaction temperature [° C.] | Reaction time [h] | Substitution [mmol/g] |
|---|---|---|
| 45 | 48 | 1.08 |
| 45 | 72 | 1.31 |
| 45 | 96 | 1.61 |
| 45 | 120 | 1.99 |

Example 2

Sulfonation with Oleum

In a temperature controlled hanging reservoir, 100 g amorphous PEKK (powder; dried over $P_2O_5$ at 60° C. in a vacuum) is added to 780 ml sulfuric acid (96.38% by weight ($H_2SO$) while stirring vigorously. The polymer dissolves without residual fraction within approximately one hour while turning yellow. The solution is stirred for another 12 hours at ambient temperature for equilibration, after which 225 ml of 65% oleum (resulting $SO_3$ concentration: 3.7% by weight) is added. The first sulfonation is observed with the addition of free $SO_3$. Until the reaction is stopped by adding 300 ml sulfuric acid, only moderate stirring is necessary. The product is precipitated threadlike and washed in water. The material is dried first in a circulating air drying furnace at 60° C. and finally exactly like the raw material.

TABLE 2

Sulfonation of amorphous PEKK with 3.7% by weight of free $SO_3$, in 96% by weight of sulfuric acid

| Reaction temperature [° C.] | Reaction time [h] | Substitution [mmol/g] |
|---|---|---|
| 20 | 39 | 1.04 |
| 20 | 54 | 1.28 |
| 20 | 72 | 1.59 |

Example 3

Sulfonation with Chlorine Sulfone Acid 100 g PEKK (fine powder) is suspended in the stirring vessel with the main quantity of the dichloromethane. Under violent stirring, 150 ml chlorine sulfone acid is quickly added together with the remaining dichloromethane (altogether 450 ml). After an initial, brief viscosity increase, the yellow colored mass becomes less viscous again. The batch becomes homogeneous and remains this way for the entire duration of the experiment. Even unground granulate dissolves completely in 15 minutes or less. The precipitation with 150 ml ethanol takes place under cooling. During this process, a thick, highly viscous polymer mass develops, which can be easily washed and isolated, however.

The amorphous PEKK used in the examples 1 to 3 had a ratio of isophtalic acid and terephthalic acid groups of 40:60.

TABLE 3

Cost-optimized sulfonation of amorphous PEKK with chlorine sulfone acid and dichloromethane in homogeneous phase

| Reaction temperature [° C.] | Reaction time [h] | Substitution [mmol/g] |
|---|---|---|
| 10 | 2 | 0.92 |
| 10 | 6 | 1.53 |
| 20 | 2 | 1.30 |
| 20 | 4 | 1.86 |
| 25 | 2 | 1.52 |

Example 4

Production of a Membrane Made of sPEKK

For the production of proton conductor membranes or cation exchanger membranes made from PEKK, 860 g n-methyl pyrrolidone are provided at −10° C. and about 140 g of sulfonated PEKK (IEC=1.59 mmol/g) is stirred in. Next, the mixture is slowly warmed up under inert gas. The stirring boiler reactor is closed at 140° C. and then continued to disperse at 180° C. until complete dissolution. After cooling to 80° C. the clear, lightly yellowish solution is filtered through 3 μm glass fiber fleece and spread into a 350 μm film on the coating system. After evaporation of the solvent at 80° C., 125° C., 160° C., a yellowish film with a thickness of approximately 50 μm is obtained.

TABLE 4

Electrochemical characterization of different polyether ketone ketone membranes

|  | PEKK 1 | PEKK 2 | PEKK 3 |
|---|---|---|---|
| Ion exchanger capacity (mmol/g) | 1.04 | 1.28 | 1.59 |
| Titrimetric IEC (mmol/g) | 0.86 | 1.17 | 1.35 |
| Perm-selectivity (0.5/0.1 M KCl, %) | 97.67 |  | 97.94 |
| Spec. conductivity (0.5 M NaCl, S/cm) | $0.28 \times 10^{-3}$ | $2.8 \times 10^{-3}$ | $3.28 \times 10^{-3}$ |
| Swelling (% by weight) | 17.03 | 27.69 | 37.19 |

Example 5

The membranes manufactured according to example 4 undergo post-treatment for applications in fuel cells. To do so, the membrane is conditioned first at 80° C. in 2M $H_2SO_4$ for 2 hours and finally cooked in fully desalinated water for 5 hours.

TABLE 5

Electrochemical characterization of post-treated polyether ketone ketone membranes

|  | PEKK 1 | PEKK 2 | PEKK 3 |
|---|---|---|---|
| Ion exchanger capacity (mmol/g) | 1.04 | 1.28 | 1.59 |
| Titrimetric IEC (mmol/g) | 0.85 | 1.13 | 1.20 |
| Perm-selectivity (0.5/0.1 M KCl, %) | 97.40 |  | 55.31 |
| Spec. conductivity (0.5 M NaCl, S/cm) | $0.97 \times 10^{-3}$ | $5.8 \times 10^{-3}$ | $31.30 \times 10^{-3}$ |
| Swelling (% by weight) | 20.03 | 35.47 | 140.90 |

Example 6

For the production of sPEKK blend membranes, 820 g n-methyl pyrrolidone are provided at −10° C. and about 36 g of a polyaryl ether sulfone (RADEL®) and 144 g of sulfonated PEKK (IEC=1.28 mmol/g) is stirred in. Next, the mixture is slowly warmed up under inert gas. The stirring boiler reactor is closed at 140° C. and then continued to disperse at 180° C. until complete dissolution. After cooling to 80° C. the clear, lightly yellowish solution is filtered through 3 μm glass fiber fleece and spread into a 300 μm film on the coating system. After evaporation of the solvent at 80° C., 115° C., 140° C., a yellowish film with a thickness of approximately 55 μm is obtained.

TABLE 6

Electrochemical characterization of polyether ketone ketone/polyether sulfone blend membranes for the electrodialysis and for fuel cell applications

|  | PEKK 2 | PEKK 4 | PEKK 5 |
|---|---|---|---|
| Portion of PPSU (% by weight) | 0 | 14 | 20 |
| Titrimetric IEC (mmol/g) | 1.17 | 1.01 | 0.86 |
| Spec. conductivity (0.5 M NaCl, S/cm) | $2.80 \times 10^{-3}$ | $2.00 \times 10^{-3}$ | $1.40 \times 10^{-3}$ |
| Swelling (% by weight) | 27.69 | 22.28 | 17.05 |

Example 7

For the production of a membrane for the direct methanol fuel cell (DMFC), 890 g n-methyl pyrrolidone are provided at −10° C. and about 105 g of sulfonated PEKK (IEC=1.04 mmol/g) and 5 g polyphenyl ether sulfone RADEL® is stirred in. Next, the mixture is slowly warmed up under inert gas. The stirring boiler reactor is closed at 160° C. and then continued to disperse at 210° C. until complete dissolution. After cooling to 80° C. the clear, lightly yellowish solution is filtered through 5 μm glass fiber fleece and spread into a 600 μm film on the coating system. After evaporation of the solvent at 80° C., 125° C., 180° C., a yellowish film with a thickness of approximately 65 μm is obtained.

For application in a DMFC, the water balance and methanol carrying in particular are of crucial importance. The membrane obtained in this example has a specific conductivity of $0.15 \times 10^{-3}$ S/cm at 20° C. at a swelling in deionized water of 9% by weight. Under permeation conditions into vacuum (pervaporation), the methanol material flow density drops by approximately a factor 10 compared to a comparison membrane on the basis of Nafion N112.

Example 8

For the production of a multilayer membrane for the DMI-C, a solution of about 8% by weight of PEKK (IEC=1.04 mmol/g) is spread into a 150 μm film and evaporated and thermally fixed at 190° C. Onto the prefabricated film, a solution of 16% by weight of sulfonated PEKK (IEC=1.58 mmol/g) is then spread into a 300 μm film and again evaporated at 110° C. with high circulating air speed and finally solidified at 150° C.

The membrane obtained in this example has a specific conductivity of $3.1 \times 10^{-3}$ S/cm at 20° C. with a swelling in deionized water of 15% by weight. On permeation conditions into the vacuum (Pervaporation) the methanol material flow density drops by approximately a factor 7, compared to a comparison membrane on the basis of Nafion N112.

Example 9

For the production of a multilayer membrane for the PEMFC, a solution of about 14% by weight of PEKK (IEC=1.59 mmol/g) is spread into a 350 μm film and evaporated and thermally fixed at 140° C. Onto the prefabricated film, a solution of 10% by weight of a perfluorsulfonic acid PFSA(EW=900 g/mol) is then spread into a 100 μm film in iso-propanol and then evaporated at 70° C. with low circulating air speed and finally solidified at 210° C.

The membrane obtained in this example has a specific conductivity of $4.5 \times 10^{-3}$ S/cm at 20° C. with a swelling in deionized water of 23% by weight. For the employment in fuel cells, the PFSA coated side of the membrane is inserted facing the cathode. This improves the service life of the membrane on one hand and the self humidification of the ionomers by the extremely hydrophilic PFSA on the other hand.

What is claimed is:

1. Sulfonated polyether ketone ketone (sPEKK), which is amorphous and/or which is available by sulfonation of amorphous polyether ketone ketone wherein a part of phenylene groups is present in a bond different from the para-position.

2. sPEKK according to claim 1, wherein a part of the phenylene groups between two keto groups is present in a bond in meta-position.

3. sPEKK according to claim 1, wherein it can be manufactured using diphenyl ether and benzene dicarbonic acid derivative.

4. sPEKK according to claim 3, wherein the benzene dicarbonic acid derivative is used as a mixture of at least two different benzene dicarbonic acid derivatives.

5. sPEKK according to claim 4, wherein the mixture contains approximately 10 to approximately 60% isophthalic acid derivative and approximately 40 to approximately 90% terephthalic acid derivative.

6. sPEKK according to claim 3 wherein approximately 1 to approximately 3 parts diphenyl ether and approximately 1 to approximately 3 parts benzene dicarbonic acid derivative is used.

7. sPEKK according to claim 1, wherein the sulfonation degree is adjusted to approximately 0.1 to approximately 3.0 mmol sulfonic acid/g polymer.

8. sPEKK according to claim 7, wherein the sulfonation degree is adjusted to approximately 1.0 to approximately 2.2 mmol sulfonic acid/g polymer.

9. sPEKK according to claim 7, wherein the sulfonation degree is adjusted to approximately 0.2 mmol sulfonic acid/g polymer or less.

10. sPEKK according to claim 1, wherein it is present in the form of a membrane.

11. sPEKK according to claim 10, wherein the membrane is at least one member of the group consisting of cation exchanger membrane and a proton conductor membrane.

12. sPEKK according to claim 10, wherein the membrane is a membrane for fuel cells.

13. sPEKK according to claim 10, wherein the membrane is a membrane for electrodialysis, electrolysis and/or batteries.

14. sPEKK according to claim 10, wherein the membrane is a blend of sPEKK with at least one member of the group consisting of polyphenylene ether sulfone, polysulfone, mixed oxides, heteropolyacids, zirconium sulfophenyl phosphonate and zirconium phosphate.

15. sPEKK according to claim 10, wherein the membrane is a multilayered membrane with other ionomers.

16. sPEKK according to claim 10, wherein the membrane is at least one member of the group consisting of a multimatrix membrane, a mechanically reinforced membrane, a coated membrane, a macroporous membrane and a linked membrane.

17. sPEKK according to claim 1, wherein it is present as a mixture with at least one further material.

18. A fuel cell, wherein it is constructed at least partially from sPEKK according to claim 10.

19. A procedure for the production of sulfonated polyether ketone ketone (sPEKK), wherein amorphous PEKK is sulfonated, in which a part of the phenylene groups between the two keto groups is present in a bond different from that para-position.

20. A procedure according to claim 17, wherein amorphous PEKK is sulfonated in which a part of the phenylene groups between two keto groups is present in a bond in meta-position.

21. A procedure according to claim 19, wherein sPEKK is manufactured using diphenyl ether and benzene dicarbonic acid derivative.

22. A procedure according to claim 21, wherein the mixture contains approximately 10 to approximately 60% isophtalic acid derivative and approximately 40 to approximately 90% terephthalic acid derivative.

23. A procedure according to claim 21, wherein approximately 1 to approximately 3 parts diphenyl ether and approximately 1 to approximately 3 parts benzene dicarbonic acid derivative is used.

24. A procedure according to claim 19, wherein the sulfonation is accomplished using at least one solvent and/or at least one sulfonation agent.

25. A procedure according to claim 24, wherein a halogenated solvent is used as solvent.

26. A procedure according to claim 24, wherein chlorine sulfone acid is used as the sulfonation agent.

27. sPEKK, which is amorphous and/or which is available by sulfonation of amorphous polyether ketone ketone wherein a part of phenylene groups is present in a bond different from the para-position, wherein it can be manufactured according to claim 19.

28. Method of utilizing sulfonated amorphous PEKK according to claim 1, for the production of membranes.

29. Method according to claim 28, wherein the membranes are at least one membrane selected from the group consisting of cation exchange membranes and proton conductors membranes.

30. Method of utilizing sulfonated amorphous PEKK according to claim 1, for the production of a polymer mixture.

31. sPEKK according to claim 16 wherein the membrane is a linked proton conductor membrane.

* * * * *